Patented Oct. 28, 1952

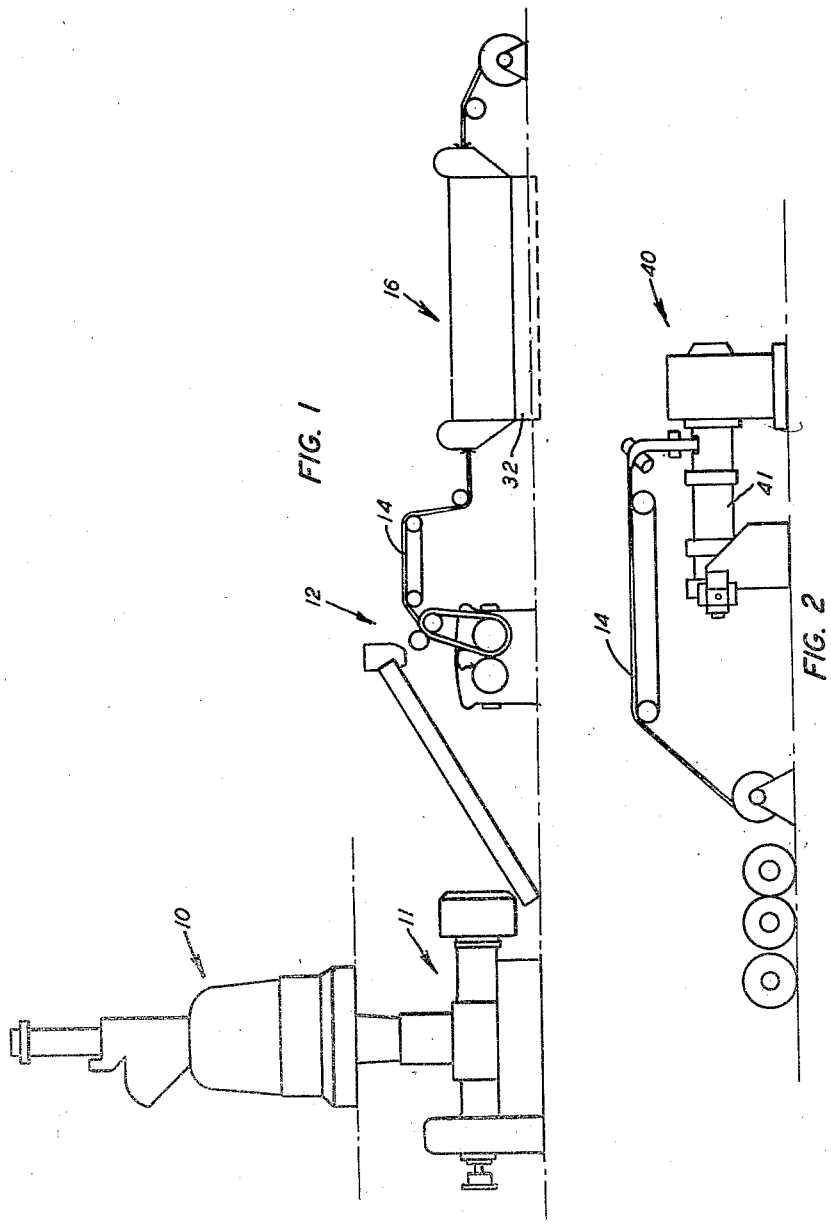

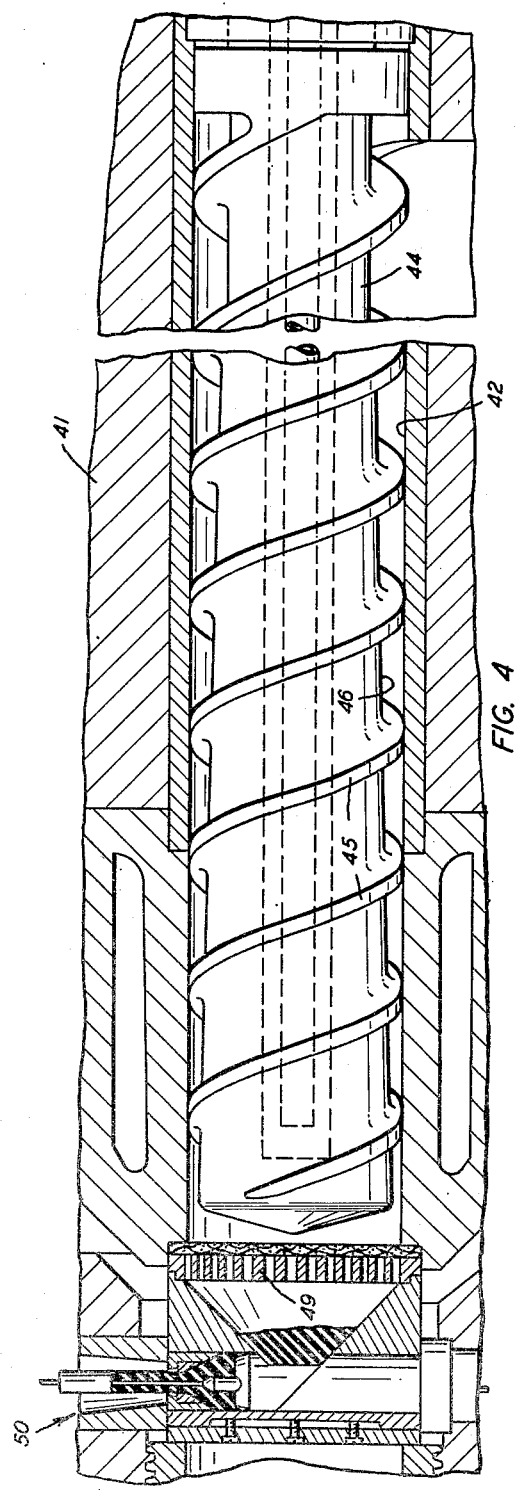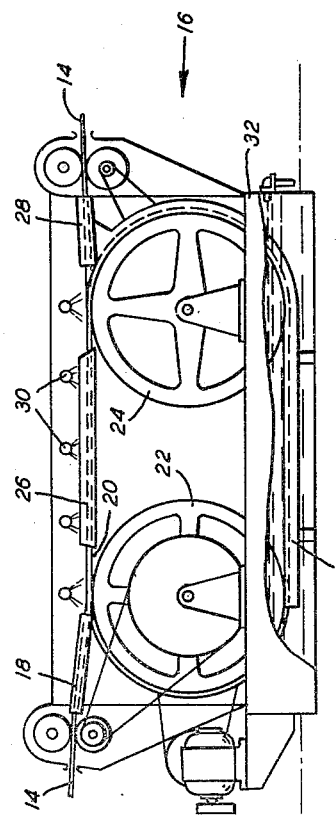

2,615,204

UNITED STATES PATENT OFFICE 2,615,204

METHOD OF PROCESSING SULFUR VULCANIZABLE ELASTOMER COMPOUNDS

Alvin N. Gray, Edgewood, Md., assignor to Western Electric Company, Incorporated, New York, N. Y., a corporation of New York Application May 13, 1949, Serial No. 92,991

12 Claims. (Cl. 18—47.5)

1

This invention relates to methods of processing sulphur-vulcanizable elastomer compounds, and more particularly to methods of preparing, extruding and curing such compounds to form articles.

In the past in the manufacture of covered conductors having coverings composed of sulphur-vulcanizable compounds, the ingredients of such a compound, except for the vulcanizing agent, such as sulphur or a sulphur-bearing material, or the accelerator, were thoroughly mixed and worked in a Banbury mixer, or the like. Subsequent to the mixing and working and shortly before extrusion of the compound the other of the vulcanizing agent and accelerator was added to and mixed into the compound on mills. The compound while still bearing the heat of the last working then was transferred to the extruders and extruded over the conductors.

This mixing of the vulcanizing agents or the accelerators into the compounds worked the compounds and heated them to temperatures at which they could be extruded satisfactorily in the form of coverings around conductors. After the compounds were extruded over the conductors, the resulting coverings were subjected to heat and pressure to vulcanize them. However, unless the hot compounds were extruded shortly after the vulcanizing agents were mixed therewith, the compounds would prevulcanize and be rendered unextrudable in smooth form. That is, they would vulcanize prior to the introduction thereof into extruders, or would vulcanize in the extruders prior to the formation of coverings therefrom. With the above-described method, it was difficult and somewhat unecomomical because of labor required to keep flowing to the extruders a supply of the compound adequate to keep the extruders operating continuously without pre-extrusion vulcanization, and, since the compound could not be introduced into the extruder at a uniform temperature, it was difficult to obtain extruded products of uniform diameter.

In order to break down the vulcanizable components of the compounds sufficiently to form high quality extruded products, it has been necessary, prior to introducing the compounds into extruders, to work the compounds a plurality of times starting from a cold state. Each compound had to be worked and mixed, starting with cold materials (i. e., materials at room temperatures), and cooled to around room temperature so that it was susceptible to further working. The compound then was reworked to achieve the necessary breakdown to place the compound in a high-

2 ly extrudable and homogeneous condition before introducing it into an extruder for extrusion thereof into finished form. Such operations require much handling equipment, working and mixing equipment, labor, power, and time.

An object of the invention is to provide new and improved methods of processing sulphur-vulcanizable elastomer compounds.

Another object of the invention is to provide new and improved methods of preparing, extruding and vulcanizing sulphur-vulcanizable elastomer compounds to form articles therefrom.

A further object of the invention is to provide new and improved methods of completely mixing all ingredients of sulphur-vulcanizable elastomer compounds prior to molding such compounds, while preventing prevulcanization of the compounds.

A method illustrating certain features of the invention may include mixing a curing agent into a sulphur-vulcanizable elastomer compound, cooling the compound to arrest vulcanization of the compound so that it can be stored without vulcanizing, extruding the compound, and working the compound as it is extruded to increase the extrudability thereof.

A complete understanding of the invention may be obtained from the following detailed description of methods forming specific embodiments thereof, when read in conjunction with the appended drawings, in which:

Fig. 1 is a schematic elevation of a portion of an apparatus for practicing a method forming one embodiment of the invention;

Fig. 2 is a schematic elevation of another portion of the apparatus;

Fig. 3 is an enlarged, fragmentary, front elevation of a portion of the apparatus shown in Fig. 1, and Fig. 4 is an enlarged, horizontal section of a portion of the apparatus shown in Fig. 2.

Referring now in detail to the drawings, there is shown in Figs. 1 and 2 an apparatus for processing an ultra-accelerated sulphur-vulcanizable elastomer compound, which may include as its essential vulcanizable constituent a diolefine polymer, such as natural rubber, which is a natural diolefine polymer, or a synthetic, sulphur-vulcanizable, rubber-like diolefine polymer, such as Buna-S (a copolymer of butadiene and styrene), Buna-N (a copolymer of butadiene and acrylonitrile), or Butyl rubber (a copolymer of isobutylene and isoprene) instead of using a diolefine polymer, an organic polysulphide material of the type sold commercially under the trade name "Thiokol" may be processed with this apparatus.

Example 1

One typical Buna-S compound that has been found satisfactory for forming insulating coverings on conductors has the following composition:

| Ingredients | Parts by Weight |
| --- | --- |
| Buna-S | 44.08 |
| Carbon black | 13.23 |
| Mill sulphur | 1.76 |
| Tetramethyl-thiuram-monosulphide | .15 |
| Aluminum hydrate | 11.02 |
| Plasticizers, softeners, oxidation retarders, etc | 29.76 |
| | 100.00 |

All the ingredients of such a compound, except either the vulcanizing agent (sulphur) or the vulcanization accelerator (tetramethyl-thiuram-monosulphide), are introduced into a Banbury mixer 10, and are mixed together thoroughly therein, in accordance with well-known procedures. In addition to thoroughly mixing the ingredients together, this mixing works the compound sufficiently to effect a substantial portion of the breakdown necessary for high quality extrusion. The compound then is dropped into a strainer 11, which strains the compound, extrudes it in strings and cuts the strings. The compound then is fed into a mill 12, and the omitted sulphur or accelerator is added to the compound to complete the formulation. The mill 12 works the compound to partially break it down and incorporates the sulphur or accelerator therein. The compound is milled sufficiently to provide only a portion of the remainder of breakdown necessary for the production of high quality extruded products, and for a period of time sufficiently short to prevent vulcanization of the compound from occurring. The temperature of the compound is kept below 250° F. throughout the mixing, straining and milling operations. The compound is kept in the Banbury mixer for about ten minutes, and it is milled for about ten minutes.

The compound is taken from the mill in the form of a strip 14, and the strip is run at once into a cooler 16 (Fig. 3), which cools the strip 14 to room temperature so that advancing vulcanization thereof is arrested for an indefinite period. The cooler 16 includes an entrance guide 18, which guides the strip to an endless cable 20. The cable traverses partly around driven grooved rolls 22 and 24 in a roughly helical path, and grooved channels 26—26 guide the cable and the strip, which is fastened temporarily to the cable, from the entrance guide to an exit guide 28, and from one of the rolls 22 and 24 to the other. The strip leaves the cooler through the guide 28. Cold water is sprayed by sprayers 30—30 onto the portions of the strip in the upper portion of the cooler while the lower portions of the strip are immersed in a tank 32 of cold water. The cold water quenches the strip to a temperature of around 70° F., at which temperature the strip may be kept for weeks without curing, even though it has a setting agent therein.

The reeled strip 14 is conveyed when needed to an extruder 40, a portion of which is disclosed and claimed in copending application Serial No. 709,498, filed November 13, 1946, by A. N. Gray for "Apparatus for Simultaneously Advancing and Plasticizing Plastic Material" (now abandoned), and in A. N. Gray Patent 2,547,000, issued April 3, 1951, on an application filed as a continuation-in-part of aforesaid application Serial No. 709,498. The extruder 40 includes a cooled extrusion cylinder 41 (Fig. 4) having a smooth-walled, imperforate bore 42 therein and a cooled stock screw 44 having threads 45—45 and a root 46. The root gradually increases in diameter from the right hand portion of the stock screw, as viewed in Fig. 4, which is the receiving portion thereof, to the left hand end, which is the delivery end thereof.

The extruder 40 works the cold compound sufficiently to achieve the remainder of the breakdown necessary for smooth, uniform extrusion and to bring its plasticity gradually to a point sufficiently high for straining and high quality, smooth, uniform extrusion. The extruder also raises the temperature of the compound gradually to an extruding temperature of about 250° F. just as the compound flows through a strainer 49 into a head 50 of the extruder, and the cooled extruder keeps the temperature of the compound below an injurious point as it is worked. This working increases the extrudability of the Buna compound so that it is formed into a smooth surfaced covering of uniform diameter throughout its length. The resulting covering then is vulcanized under heat and pressure by known means, preferably in a continuous vulcanization apparatus of known design.

Example 2

A natural rubber compound that may be processed by the methods described hereinabove has the following formula:

| Ingredients | Parts by Weight |
| --- | --- |
| Crude rubber | 27.00 |
| Water ground whiting | 33.75 |
| Zinc oxide | 1.35 |
| Lithopone | 33.74 |
| Mill sulphur | 1.00 |
| Tetramethyl-thiuram-disulphide | 0.96 |
| Plasticizers, softeners, oxidation retarders, etc | 2.20 |
| | 100.00 |

The ingredients of this compound except either the vulcanizing agent (sulphur) or the accelerator (tetramethyl-thiuram-disulphide) are mixed together in the Banbury mixer 10, and are worked and mixed together for about ten minutes, the temperature being kept below 250° F. The compound then is strained by the strainer 11, the omitted vulcanizing agent or accelerator is added and the compound is milled on the mill 12 for about ten minutes at temperatures under 250° F. The compound then is stripped from the mill 12, and is cooled by the cooler 16 to room temperature. The mixer and the mill effect most but not all of the breakdown necessary for smooth, uniform extrusion.

The cold compound then may be stored awaiting extrusion, and when needed is introduced cold into the extruder 40. The extruder works the compound to the extent necessary to achieve the remainder of breakdown and the heating to make it extrudable and strainable, and forces it through a die which forms it into a covering over a filamentary conductor, after which the covering is vulcanized immediately. While in the extruder the compound is kept at a temperature below 250° F. to prevent vulcanization thereof in the extruder.

The above-described methods of processing and extruding vulcanizable compounds avoid milling operations shortly prior to extrusion, which operations were necessary to introduce vulcanizing agents into the compounds very shortly before extrusion to prevent prevulcanization or presetting of the compounds. By cooling the compounds immediately after the second of the vulcanizing agent and the accelerator is introduced therein, the compounds may be stored at room temperature for weeks if necessary without appreciable setting thereof. Furthermore, since the compounds are always at the same temperature as they are introduced into the extruder, products of unvarying diameter are produced for a given worm speed of the extruder. Consequently, a high degree of flexibility of operation is provided with the above-described methods even though the compounds are highly accelerated. That is, the compounds need not be made up immediately before their extrusion, and a surplus of the compounds may be maintained for the extruders so that the operations of the extruders need not be slowed or stopped for lack of compound. Furthermore, the compounds may be formed continuously for extrusion even though surpluses are built up. Thus, the preextrusion processing operations are much more efficient than those previously known.

In the methods described hereinabove, there is no problem of keeping the temperatures of the compounds sufficiently high for plasticity before introduction of the compounds into the extruders. Thus, the compounds may be delivered to the extruders without precautions to prevent cooling of the compounds, which precautions have been necessary in the methods of the prior art. Since the compounds are introduced into the extruder at substantially the same temperature (room temperatures) uniformity of the extrusion operations can be obtained without varying extrusion conditions. When hot compounds are brought to extruders, it is impossible, without great effort, to keep the temperatures of various batches uniform.

In the use of the word "sulphur-vulcanizable" or any form of this term, throughout this application, it is meant sulphur hardenable or setting as distinguished from setting by agents other than sulphur or an essentially sulphur-bearing setting agent. In the use of the term "curing agent" throughout this application it is intended to designate a vulcanizing agent, a vulcanization accelerator or both. Obviously, vulcanizing agents and vulcanization accelerators other than those exemplified hereinabove can be used successfully with the above-described methods.

In the use of the term "ultra-accelerated," with reference to materials and compounds, or the like, in this application, it is intended to designate compounds which will substantially cure within about 30 seconds when in a generally annular form 0.050 inch in wall-thickness and when subjected exteriorly to steam under a pressure of about 250 pounds per square inch, or conditions equivalent thereto. The above-described methods are workable with compounds which are not ultra-accelerated as well as with compounds which are ultra-accelerated, as are the compounds described hereinabove, but the greatest value of the methods is in handling ultra-accelerated compounds.

What is claimed is:

1. The method of processing an ultra-accelerated, elastomer compound including a copolymer of butadiene and styrene as its essential elastomer constituent and sulphur, which comprises introducing all the ingredients of such a compound except the sulphur into a mixer, mixing and working said ingredients of the compound in the mixer, passing the mixed and worked compound directly from the mixer into a strainer, straining the compound in the strainer, milling the sulphur into the strained compound, the working done during the preceding steps being sufficient to partially break down the polymer but insufficient to cause the compound to be smoothly and uniformly extrudable into finished-article form, chilling the entire mass of the compound immediately after the sulphur has been milled therein sufficiently to arrest vulcanization during storage thereof, subsequently introducing the compound into an extruder at substantially room temperature, and extruding the compound and simultaneously working the compound sufficiently to complete the breakdown necessary for smooth, uniform extrusion thereof.

2. The method of processing ultra-accelerated elastomer compounds including a sulphur-vulcanizable, diolefine polymer as the essential vulcanizable ingredient thereof and a curing agent therefor, which comprises mixing and working all the ingredients of such a compound except the curing agent in a mixer, milling the curing agent into the compound, the working done during the preceding steps being sufficient to partially break down the polymer but insufficient to cause the compound to be smoothly and uniformly extrudable into finished-article form, then quickly cooling the milled compound sufficiently to arrest vulcanization during prolonged storage thereof, advancing the compound continuously in an extruder to and through a die starting with the compound in its cooled condition, working the compound sufficiently as it is so advanced to effect the remainder of the breakdown necessary to cause the compound to be smoothly and uniformly extrudable as it reaches the die, and cooling the compound as it is so worked to prevent setting thereof in the extruder.

3. The method of processing an ultra-accelerated, sulphur-vulcanizable elastomer compound ultimately containing a curing agent and having as the essential elastomer constituent thereof a material of the group consisting of natural rubber, copolymers of butadiene and styrene, copolymers of butadiene and acrylonitrile, copolymers of isobutylene and isoprene and organic polysulphides, which comprises mixing together and working all the ingredients of such a compound except the curing agent in a mixer, milling the curing agent into the mixture on a mill, the working performed during said mixing and milling operations being sufficient to partially break down the elastomer but insufficient to cause the resulting compound to be readily extrudable into a smooth and uniform covering on a conductor, removing the resulting compound from the mill, immediately and quickly cooling the entire mass of the milled compound sufficiently to arrest setting of the compound during storage thereof, subsequently introducing the compound in its cooled condition into an extruder, advancing a core through the extruder, working the compound in the extruder sufficiently to effect the remainder of the breakdown necessary for smooth, uniform extrusion, extruding the compound from the extruder as a covering on the core, and vulcanizing the covering.

4. The process of insulating a conductor with an ultra-accelerated compound including a sulphur-vulcanizable, diolefine polymer, filler material, a peptizer, softeners and a curing agent, which comprises mixing together said ingredients except the curing agent in a Banbury mixer to form a homogeneous mixture and working the mixture sufficiently to partially break down the polymer, incorporating the curing agent into the mixture on a mill at a temperature sufficiently low to prevent incipient vulcanization thereof, forming the milled compound into a strip, immediately quenching the compound strip in cold water to prevent vulcanization thereof for a prolonged storage period, storing the compound strip at room temperature, subsequently introducing the compound strip into an extruder at room temperature, passing a conductive core of indefinite length through the extruder, sequentially working each increment of the compound in the extruder sufficiently to effect sufficient further breakdown of the polymer to cause the compound to be readily extrudable, straining the compound in the extruder, extruding the thus-worked and strained compound into a covering on the core, and vulcanizing the resulting covering on the core.

5. The method of processing ultra-accelerated, sulphur-vulcanizable elastomer compounds ultimately including sulphur, which comprises working and mixing all the ingredients of such a compound except the sulphur in a mixer for a period sufficient to partially break down the elastomer, introducing the omitted sulphur into the compound on a mill while maintaining the compound at a temperature sufficiently low to prevent incipient vulcanization thereof, simultaneously removing the sulphur-containing compound from the mill in the form of a continuous length of compound and passing the length of compound through a cooler, cooling the compound in the cooler sufficiently to permit it to be stored without vulcanizing, subsequently introducing the compound at substantially room temperature into an extruder, and simultaneously working the compound in the extruder sufficiently to render the compound readily extrudable and extruding the compound.

6. The method of processing ultra-accelerated, sulphur-vulcanizable, diolefine polymer compounds ultimately including an ultra-accelerator and sulphur as curing agents, which comprises working and mixing all the ingredients of such a compound except one of said curing agents in a mixer for a period sufficient to partially break down the polymer, milling the omitted curing agent into the compound on a mill, maintaining the temperature of the compound during said working, mixing and milling operations below 250° F., removing the resulting compound from the mill, cooling the entire mass of the compound to room temperature as soon as it is removed from the mill, subsequently introducing the compound at room temperature into an extruder, working the compound in the extruder sufficiently to effect the remainder of the breakdown necessary for smooth and uniform extrusion thereof, and extruding the compound from the extruder in article form.

7. The method of processing an ultra-accelerated, sulphur-vulcanizable elastomer, electrical insulating compound ultimately including sulphur and having a diolefine polymer as the essential elastomer constituent thereof, which comprises introducing all the ingredients of such a compound except the sulphur into a mixer, working and mixing said ingredients in the mixer for a period sufficient to partially break down the elastomer, passing the worked and mixed compound directly from the mixer into a strainer, straining the compound in the strainer, milling the omitted sulphur into the strained compound, maintaining the temperature of the compound below 250° F. during said working, mixing, straining and milling operations, forming the resulting sulphur-containing compound into a strip, immediately passing the compound strip through a cooler, subjecting the compound strip to cold water in the cooler to lower its temperature substantially to room temperature, storing the compound at room temperature, subsequently introducing the strip of compound at room temperature into an extruder, working the compound in the extruder sufficiently to effect the remainder of the breakdown necessary for smooth and uniform extrusion thereof, straining the compound in the extruder, and extruding the thus-worked and strained compound from the extruder in article form.

8. The method of processing an ultra-accelerated, sulphur-vulcanizable, electrical insulating, elastomer compound ultimately including sulphur, and having as the essential elastomer constitutent thereof a material of the group consisting of natural rubber, copolymers of butadiene and styrene, copolymers of butadiene and acrylonitrile, copolymers of isobutylene and isoprene and organic polysulphides, which comprises working and mixing all the ingredients of such a compound except the sulphur in a mixer for a period sufficient to partially break down the elastomer but insufficient to cause the compound to be smoothly and uniformly extrudable around a conductive core, milling the omitted sulphur into the compound, forming the resulting compound into a strip, immediately subjecting the compound strip to sufficient cold water to cool it to a temperature at which it may be stored without vulcanizing, subsequently introducing the cooled strip of compound into an extruder without intermediate working thereof, passing a conductive core of indefinite length through the extruder, working the compound in the extruder sufficiently to effect the remainder of the breakdown necessary for smooth and uniform extrusion thereof, extruding the thus-worked compound into a covering on the core, and vulcanizing the resulting covering.

9. The method of processing an ultra-accelerated electrical insulating, rubber compound ultimately including sulphur, which comprises working and mixing all the ingredients of such a compound except the sulphur in a mixer for a period sufficient to partially break down the rubber but insufficient to cause the compound to be smoothly and uniformly extrudable around a conductive core, milling the omitted sulphur into the compound, forming the resulting compound into a strip, immediately subjecting the compound strip to sufficient cold water to cool it to a temperature at which it may be stored without vulcanizing, subsequently introducing the cooled strip of compound into an extruder without intermediate working thereof, passing a conductive core of indefinite length through the extruder, working the compound in the extruder sufficiently to effect the remainder of the breakdown necessary for smooth and uniform extrusion thereof, extruding the thus-worked compound into a covering on the core, and vulcanizing the resulting covering.

10. The method of processing an ultra-accelerated, electrical insulating, elastomer compound including a rubbery copolymer of butadiene and styrene as the elastomer constituent and sulphur, which comprises working and mixing all the ingredients of such a compound except the sulphur in a mixer for a period sufficient to partially break down the elastomer but insufficient to cause the compound to be smoothly and uniformly extrudable around a conductive core, milling the omitted sulphur into the compound, forming the resulting compound into a strip, immediately subjecting the compound strip to sufficient cold water to cool it to a temperature at which it may be stored without vulcanizing, subsequently introducing the cooled strip of compound into an extruder without intermediate working thereof, passing a conductive core of indefinite length through the extruder, working the compound in the extruder sufficiently to effect the remainder of the breakdown necessary for smooth and uniform extrusion thereof, extruding the thus-worked compound into a covering on the core, and vulcanizing the resulting covering.

11. The method of processing an ultra-accelerated, sulphur-vulcanizable elastomer, electrical insulating compound ultimately including sulphur and having a rubbery copolymer of butadiene and styrene as the essential elastomer constituent thereof, which comprises introducing all the ingredients of such a compound except the sulphur into a mixer, working and mixing said ingredients in the mixer for a period sufficient to partially break down the elastomer but insufficient to cause the compound to be smoothly and uniformly extrudable around a conductive core, passing the worked and mixed compound directly from the mixer into a strainer, straining the compound in the strainer, milling the omitted sulphur into the strained compound, maintaining the temperature of the compound below 250° F. during said working, mixing, straining and milling operations, forming the resulting sulphur-containing compound into a strip, immediately passing the compound strip through a cooler, subjecting the compound strip to sufficient cold water in the cooler to lower its temperature substantially to room temperature, holding the compound at room temperature, subsequently introducing the strip of compound at room temperature into an extruder, advancing a conductor through the extruder, working the compound in the extruder sufficiently to effect the remainder of the breakdown necessary for smooth and uniform extrusion thereof, straining the compound in the extruder, and extruding the thus-worked and strained compound as a covering on the conductor.

12. The method of processing an ultra-accelerated, sulphur-vulcanizable, electrical insulating compound ultimately including sulphur and a vulcanization accelerator and having a copolymer of butadiene and styrene as the essential elastomer constituent thereof, which comprises introducing all the ingredients of such a compound except the sulphur into a Banbury mixer, working and mixing said ingredients in the Banbury mixer for a period of about 10 minutes whereby the elastomer is worked sufficiently to effect only a part of the breakdown necessary for smooth and uniform extrusion of the compound, passing the worked and mixed compound directly from the mixer into a strainer, straining the compound in the strainer, placing the compound on a mill, adding the omitted sulphur into the strained compound and milling the compound on the mill over a total period of about 10 minutes, maintaining the temperature of the compound below 250° F. during said working, mixing, straining and milling operations, removing the sulphur-containing compound from the mill in the form of a strip, immediately passing the compound strip through a cooler, subjecting the compound strip to sufficient cold water in the cooler to lower its temperature to about room temperature, holding the compound at room temperature, subsequently introducing the strip of compound at room temperature into an extruder, advancing a conductor of indefinite length through the extruder, working the compound in the extruder sufficiently to effect the remainder of the breakdown necessary for smooth and uniform extrusion thereof, straining the compound in the extruder, extruding the thus-worked and strained compound into a covering on the conductor, and vulcanizing the resulting covering.

ALVIN N. GRAY.

REFERENCES CITED

The following references are of record in the file of this patent:

UNITED STATES PATENTS

| Number | Name | Date |
|---|---|---|
| 2,281,375 | Nowak | Apr. 28, 1942 |
| 2,291,212 | Clinefelter | July 28, 1942 |
| 2,496,147 | Brillhart | Jan. 31, 1950 |

OTHER REFERENCES

Gottlob, Technology of Rubber, 1927, pages 100, 105, 132 and 225. (Copy in Scientific Library.)

Vanderbilt-Industrial and Engineering Chemistry, Nov. 1942, pg. 1311 (1948).

Marchionna, Butalastic, 1946, pages 415 and 482. (Copy in Scientific Library.)